(No Model.) 2 Sheets—Sheet 1.
V. W. BLANCHARD.
MIXING CHAMBER FOR FURNACES.
No. 413,917. Patented Oct. 29, 1889.
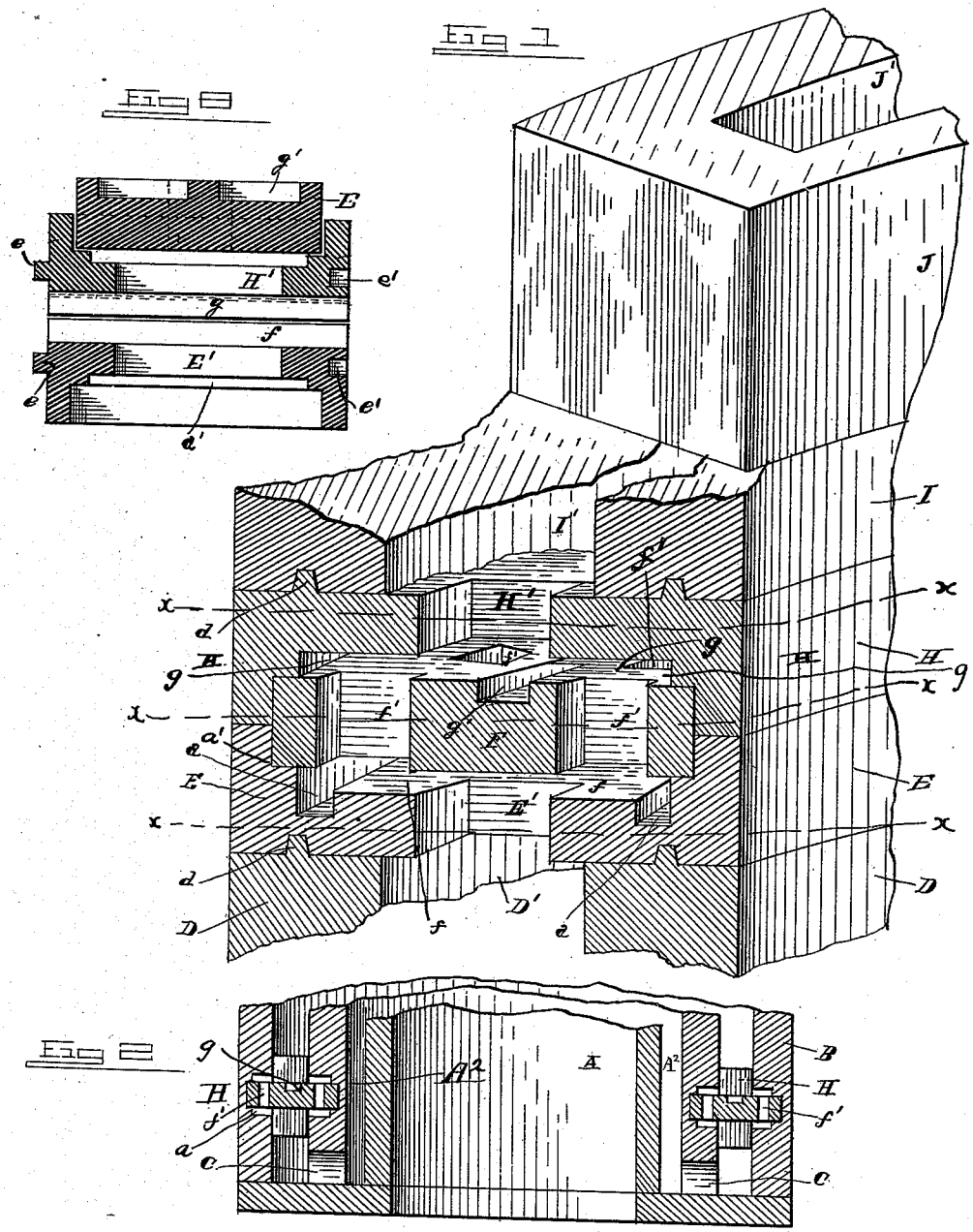
WITNESSES
INVENTOR
Virgil W Blanchard
by
T. N. Alexander
Attorney

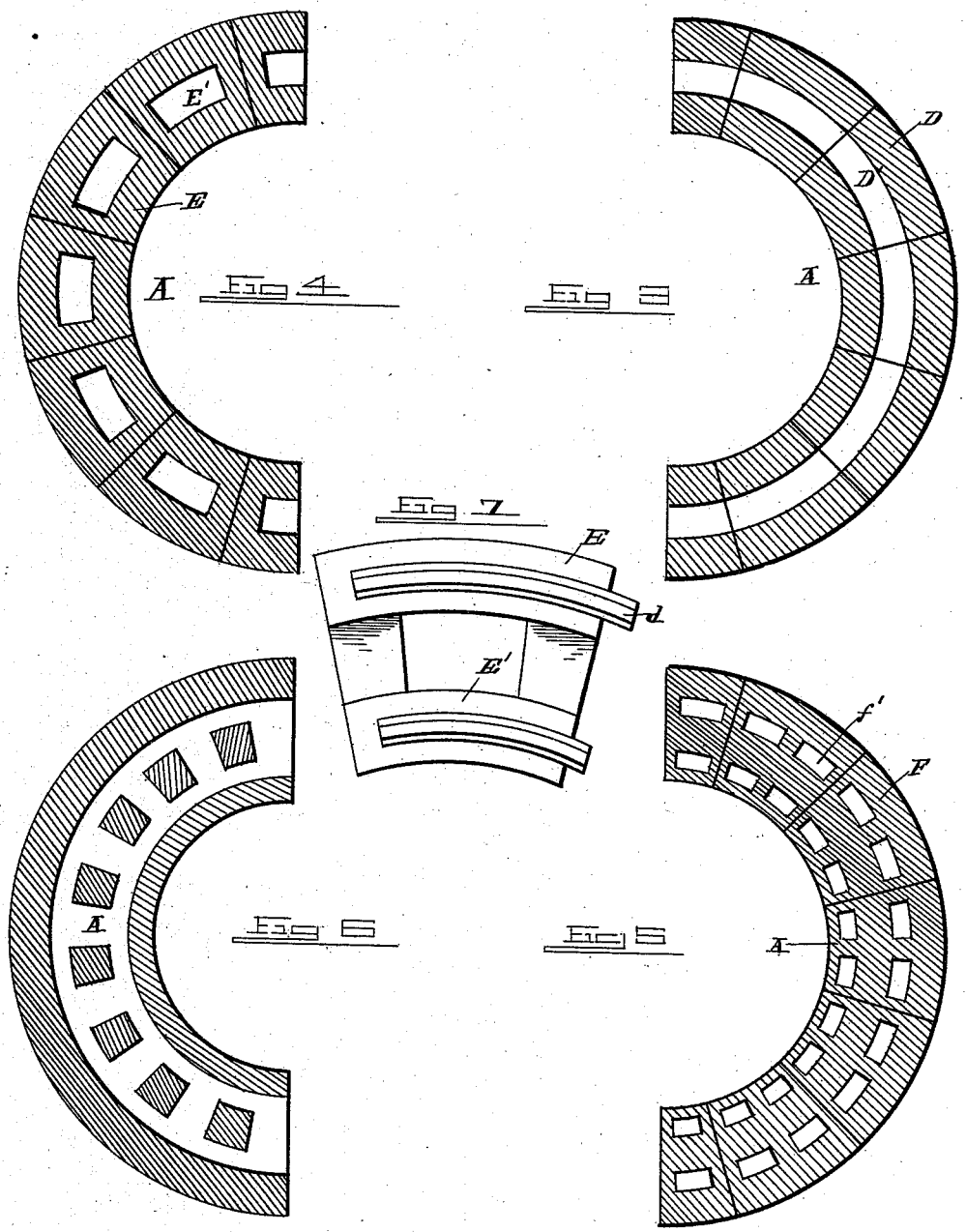

UNITED STATES PATENT OFFICE.

VIRGIL W. BLANCHARD, OF NEW YORK, N. Y., ASSIGNOR TO JOSEPH A. DAVIS, OF SAME PLACE.

MIXING-CHAMBER FOR FURNACES.

SPECIFICATION forming part of Letters Patent No. 413,917, dated October 29, 1889.

Application filed April 12, 1889. Serial No. 306,973. (No model.)

*To all whom it may concern:*

Be it known that I, VIRGIL W. BLANCHARD, of New York, in the county and State of New York, have invented certain new and useful Improvements in Mixing-Chambers for Furnaces; and I do hereby declare that the following is a full, clear, and exact description thereof, reference being had to the accompanying drawings, and to the letters of reference marked thereon, which form part of this specification, in which—

Figure 1 is a perspective view showing in detail and partly in section my invention. Fig. 2 is a vertical section of a base of a furnace, illustrating parts of my invention applied to it. Figs. 3, 4, 5, and 6 are horizontal sectional views taken in the dotted lines on Fig. 1. Fig. 7 is a bottom view of one of the bricks, showing its interlocking ribs. Fig. 8 is a vertical section showing a modification wherein I lock the bricks together endwise.

This invention has a special relation to furnaces which are designed for producing intense heat, as illustrated, for instance, in my patent bearing date on the 11th day of December, 1883, and numbered 289,963, although it is applicable to other furnaces, such as is shown in my application for patent on furnaces filed March 29, 1889, numbered serially 305,298; and it consists in a novel construction in a gas-mixing chamber, which will be fully understood from the following description, when taken in connection with the annexed drawings.

A designates the central chamber or magazine of a furnace, and B the outer wall thereof, which may be constructed as has been fully described in my patent above referred to. This magazine A communicates with the fuel-chamber of the furnace and receives the gaseous products of combustion therefrom, and outside of said magazine and communicating only with the upper end thereof is a descending flue $A^2$, that communicates at bottom with the lowest of a series of mixing-chambers by radial outlets C C. The gaseous products of combustion rising in magazine A are forced in escaping therefrom to descend in flue $A^2$, and the hydrogenous gases evolved in the combustion of fuel, being lightest, will be trapped in the upper portion of said magazine and flue, which are suitably closed, and retained until oxidized and consumed, and the carbonic-oxide gas will be forced downward through flue $A^2$ and will enter the mixing-chambers, which, with the other portions of the furnace, are intensely heated by the combustion of the hydrogenous elements, and said gases will be so continuously trapped and retarded and thoroughly mixed with fresh oxygen supplied as in my application for patent above referred to that the whole body of gases will be converted into carbonic-acid gas. The hydrogen, not having any direct outlet from the upper portion of the flue, will be gradually consumed and oxidized, and the vast amount of heat units therein will be utilized to raise the temperature of the furnace and assist in the oxidation of the carbonic oxide in the mixing-chambers.

D designates a fire-brick, which is constructed with ribs $d$, that interlock with another fire-brick E. The fire-brick D has a passage D' through it, which is of greater superficial area than a communicating passage E', which is through the brick E. Each brick E is constructed with one or two soot-traps $a$, and also with a recess $a'$, adapted to receive a brick F, which, when in place, leaves a passage $f$ beneath it, and which is constructed with vertical passages $f'$ through it, which passages are of less superficial area than the passages E' in the course below it. The upper side of each brick F is provided with soot-traps $g'$.

H designates bricks, which are so constructed that they afford horizontal passages $g$, which lead through passages H', of less area than the combined area of the passages through the brick F.

I designates a brick through which is a passage I', of greater area than the passage H' through the brick H.

J designates a brick through which is a passage J', of greater area than the passage I' through the brick I.

It will be observed by reference to Figs. 1 and 7 that I interlock by means of the concentric tenons $d$ the several courses of bricks, so that I prevent radial displacement.

By reference to Fig. 8 it will be observed that I have on one end of each brick a tenon e and in the opposite end of the same brick a mortise or receptacle e', by which the bricks can be interlocked endwise.

The operation is as follows: The gases from the fuel-chamber of the furnace, mixed with air and unburned carbonaceous and hydrogenous matter and ash, enter what I have denominated the "mixing-chamber" at the lowest point thereof through the horizontal passages C. After entering this chamber they rise through a passage D', are contracted in their upward flight through passages E', are expanded in passing through the openings in brick F, deposit a portion of the ash and soot in the trap a, are again contracted while ascending through passage f', deposit the soot and ash again into the traps g', expand again in the chamber g, are condensed in their passage through the apertures H', and are expanded in the channel I' of the brick I. In other words, the mixing-chambers, laid as described, form flues of irregular area in cross-section throughout their vertical length. Through such flues the gases from the fuel-chamber are made to pursue a tortuous course. The velocity of the gases in the enlarged parts of the flue is of course less than in the contracted or narrow parts thereof, thereby facilitating the deposit of particles of matter in the traps. As the same quantity or volume of gases passes through the narrow and wide portions of the flue in the same moment of time, it is evident that the gases must be contracted or compressed in the narrow parts or be of denser volume therein than in the larger portions of the flue. This is obvious from the fact that the same amount of gases escapes from the upper ends of the flues that enters at the bottoms thereof. It will thus be seen that the operation of expansion and contraction of the gases is frequently repeated in their upward flight through the mixing-chamber.

The fire-brick walls of the mixing-chamber should of course be at a white heat.

Those particles of flying matter which are heavier than the gas will be temporarily deposited in the traps above described, to be finally oxidized and converted into combustible molecules.

Having thus described my invention, what I claim as new is—

1. In a furnace, the combination of the flue or magazine and a descending flue communicating therewith with mixing-chambers composed of layers of fire-bricks having central vertical passages through them and the intermediate fire-bricks having perforations and soot-traps, substantially as described.

2. In a furnace, the combination of a magazine and a descending flue communicating therewith at its upper end with the mixing-chambers composed of bricks F, having vertical passages and soot-traps, and the upper and lower bricks E and H, also having vertical passages and communicating with the passages of bricks F, all substantially as described.

3. In a furnace, the combination of a flue through which the gases are caused to descend with mixing-chambers composed of layers of fire-bricks E and H, having vertical passages through them, and the fire-bricks F, having vertical openings of different superficial area to the openings in bricks E and H and interposed between the same, substantially as and for the purpose specified.

4. A cellular or chambered fire-brick for the mixing-chamber of furnaces, constructed with a tenon on one end and a mortise on the opposite end and ribs and recesses in its upper and lower sides, respectively, said brick having a passage through it of varying superficial area and also provided with soot-traps, substantially as specified.

In testimony that I claim the foregoing as my own I affix my signature in presence of two witnesses.

VIRGIL W. BLANCHARD.

Witnesses:
ALEX. S. STEUART,
P. L. BROOKS.